United States Patent [19]
Rijckaert

[11] Patent Number: 5,424,878
[45] Date of Patent: Jun. 13, 1995

[54] ARRANGEMENT FOR RECORDING A FIRST, A SECOND AND A THIRD DIGITAL SIGNAL, IN THAT ORDER, IN A TRACK ON A MAGNETIC RECORD CARRIER

[75] Inventor: Albert M. A. Rijckaert, Eindhoven, Netherlands

[73] Assignee: U.S. Philips Corporation, New York, N.Y.

[21] Appl. No.: 127,223

[22] Filed: Sep. 27, 1993

[30] Foreign Application Priority Data

Oct. 30, 1992 [EP] European Pat. Off. ............ 92203342

[51] Int. Cl.$^6$ ............................................. G11B 5/02
[52] U.S. Cl. ..................................... 360/19.1; 360/48
[58] Field of Search ............... 360/13, 14.1, 14.2, 360/14.3, 18, 19.1, 40, 44, 48, 61, 64; 358/343

[56] References Cited

U.S. PATENT DOCUMENTS

| | | | |
|---|---|---|---|
| 4,772,960 | 9/1988 | Takahashi et al. | 360/19.1 X |
| 4,907,102 | 3/1990 | Tsunoda et al. | 360/48 X |
| 4,916,553 | 4/1990 | Yoshioka et al. | 360/19.1 X |

FOREIGN PATENT DOCUMENTS 0483873 5/1992 European Pat. Off. .

Primary Examiner—Andrew L. Sniezek
Attorney, Agent, or Firm—Edward W. Goodman

[57] ABSTRACT

A magnetic recording arrangement records a first digital signal, for example a subcode signal, in a first track portion (TP1), a second digital signal, for example a digital audio signal, in a second track portion TP2, and a third digital signal, for example a video signal, in a third track portion (TP3) in a track on a magnetic record carrier. The first, the second and the third track portions are separated from each other by edit gaps ($G_3$, $G_4$). Moreover, viewed in a direction from the beginning towards the end of the track, the first, the second and the third digital signals are recorded in this sequence in the first, the second and the third track portions, respectively, and the length of the third track portion is greater than the length of the second portion. Furthermore, the length of the second track portion is greater than the length of the first track portion. Preferably, the length of the edit gap ($G_3$) between the first and the second track portions is smaller than the length of the edit gap ($G_4$) between the second and the third track portion.

7 Claims, 2 Drawing Sheets

ARRANGEMENT FOR RECORDING A FIRST, A SECOND AND A THIRD DIGITAL SIGNAL, IN THAT ORDER, IN A TRACK ON A MAGNETIC RECORD CARRIER

BACKGROUND OF THE INVENTION

1. Field of the Invention

The invention relates to an arrangement for recording a first digital signal, for example a subcode signal, a second digital signal, for example a digital audio signal, and a third digital signal, for example a video signal, in tracks on a magnetic record carrier, on which record carrier the tracks extend parallel to each other and at an angle relative to the longitudinal direction of said record carrier, the first digital signal being recorded in a first track portion, the second digital signal being recorded in a second track portion, and the third digital signal being recorded in a third track portion of the tracks, which arrangement comprises an input terminal for receiving the first digital signal, an input terminal for receiving the second digital signal, an input terminal for receiving the third digital signal, and recording means for recording the first, the second and the third digital signal in the first, the second and the third track portion respectively, which first, second and third track portions are separated from one another by means of an edit gap.

2. Description of the Related Art

An arrangement of the type defined in the opening paragraph is known from the published European Patent Application EP 483,873 A2. Generally, a synchronization signal is recorded in the tracks at the beginning of these tracks. Moreover, the first digital signal is generally an ATF signal intended to enable tracking, so that a reproducing head can be positioned correctly at the beginning of a track to be reproduced. The edit gaps have been provided to enable editing. This means that after a recording on the record carrier has been made, for example, only the digital audio signal is overwritten in a subsequent edit step and the video signal remains intact.

SUMMARY OF THE INVENTION

It is an object of the invention to provide an arrangement having an improved edit facility. To this end the arrangement in accordance with the invention is characterized in that the recording means are adapted to record the first, the second and the third digital signal in the first, second and third track portions in such a manner that, viewed in a direction from the beginning towards the end of the first track, the first, the second and the third digital signals are recorded in this sequence in the first, the second and the third track portions, respectively, and the length of the third track portion is greater than the length of the second track portion.

The invention is based on the recognition of the following fact. During an edit step, locking-in is effected to the synchronization signal situated at the beginning of the track and the magnetic head can be positioned correctly on the track by the detection of the tracking information present in the first track portion of adjacent tracks. As a result of drum jitter during editing, it may occur that the length of the track portion recorded in the edit step is no longer in conformity with the length of the overwritten track portion. Moreover, as a result of, on the one hand, the non-straightness of the ruler and, on the other hand, the position of the record carrier against this ruler, the magnetic head is no longer situated on the original track but has deviated therefrom in a lateral direction.

Editing a track portion of greater length leads to a larger length variation and may result in a larger lateral deviation than in the case that a track portion of smaller length is edited. If track portions of comparatively great length are situated at a more advanced position in a track, this may result in a subsequent track portion being partly overwritten or in the next track portion no longer correctly joining the end of the edited track portion. This may give rise to problems when the tracks are subsequently read out. By arranging track portions of small(er) length at more advanced positions in the track, the length variations and the lateral variations will be smaller, which reduces the likelihood of a following track portion being overwritten and which ensures that a subsequent track portion better adjoins the edited track portion.

The step of arranging longer track portions at more backward positions in the track further has the advantage that preceding edit gaps in the track can be shorter because editing smaller track portions results in smaller length variations of these track portions after editing. This enables more information to be accommodated in the tracks than in the case of edit gaps of maximal length based on the maximum possible length variations during editing.

BRIEF DESCRIPTION OF THE DRAWINGS

The invention will now be described in more detail hereinafter. In the drawings.

DESCRIPTION OF THE PREFERRED EMBODIMENT

Figure 1:
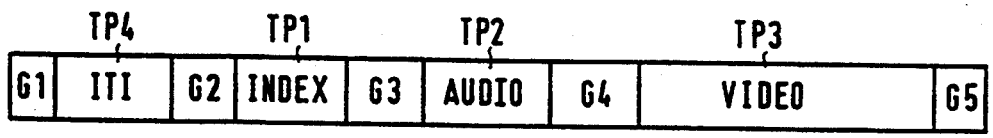
FIG. 1 illustrates the format of the signals recorded in a track.

FIG. 1 illustrates the format of a track as recorded on a magnetic record carrier by an arrangement of the helical scan type. The left-hand end of the track shown in FIG. 1 is the beginning of the track and the right-hand end is the end of the track. The track comprises a plurality of contiguous track portions. The track portion $G_1$ is the preamble track portion, also referred to as "clock run-in" track portion, which comprises 47 25-bit preamble code words, also called "clock run-in" words. These 25-bit clock run-in words are described comprehensively in the published European Patent Application EP 492,704 A1, corresponding to U.S. Pat. No. 5,245,483. (PHN 13.546). The end of the track is constituted by the postamble track portion $G_5$. This postamble track portion comprises 47 25-bit postamble code words. A postamble code word is the inverse of a preamble code word.

The track portion $G_1$ is followed by the track portion TP4 which contains inter alia synchronization information and a tracking signal. This track portion has a length of 86 25-bit words. The track portion $G_2$ is an edit gap having a length of 37 25-bit words.

The track portion $G_2$ is followed by the track portion TP1 which contains inter alia subcode information. This information may be absolute and/or relative time information and a table of contents (TOC). This track portion has a length of 45 25-bit words. The track portion $G_3$ is also an edit gap having a length of 52 25-bit words. The track portion $G_3$ is followed by the track portion TP2 which contains digital audio information arranged in 423 25-bit words. The track portion TP2 in fact comprises 9 rows (or sync blocks) each having a length of 47 25-bit words, as described in European Patent Application EP 492,704 A1. The track portion $G_4$ is an edit gap having a length of 62 25-bit words.

The track portion $G_4$ is followed by the track portion TP3 which contains digital audio information. This track portion has a length of 4136 25-bit words. The track portion TP3 in fact comprises 88 rows (or sync blocks) each having a length of 47 25-bit words, as described in said European Patent Application.

As already stated, the edit gap $G_2$ contains 37 25-bit words. In fact, it comprises 19 postamble code words followed by 18 preamble code words. As stated, the edit gap $G_3$ contains 52 25-bit words. In fact, it comprises 34 postamble code words followed by 18 preamble code words. As stated, the edit gap $G_4$ contains 62 25-bit words. In fact, it comprises 44 postamble code words followed by 18 preamble code words.

In an edit step, the track portions TP1, TP2 and TP3 can be overwritten in an edit mode. The track portion TP4 remains intact because this portion contains the synchronization information and the tracking information required to enable editing. In an edit step it is thus possible to overwrite only the subcode information, or only the audio information, or only the video information in the respective track portions TP1, TP2 and TP3 with new information. However, it is also possible to overwrite two or three track portions in a track.

FIG. 1 illustrates that as a track portion, such that track portions TP1, TP2 and TP3, becomes longer it is situated further backward in the track. FIG. 1 further shows that the edit gaps, such as the edit gaps $G_2$, $G_3$ and $G_4$, become shorter as they are situated at more advanced position in the track.

The object of these steps has already been set forth in the introductory part.

Figure 2:
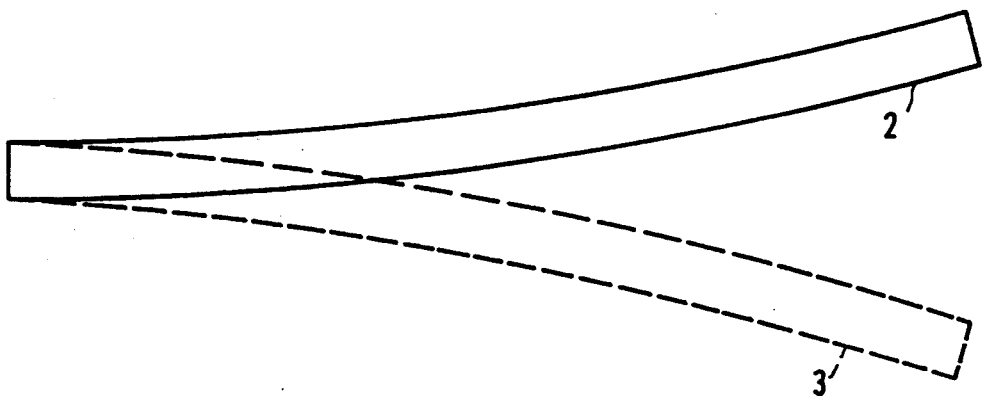
FIG. 2 shows two tracks recorded by means of two different arrangements.

It is now assumed that the tracks have been recorded in an arrangement with such a tape transport that the tracks deviate to one side. In FIG. 2, this is represented by the track 2 shown in solid lines. Subsequently, an edit step is performed in another arrangement which has a deviation to the opposite side, see the track 3 shown in broken lines.

Figure 3A:
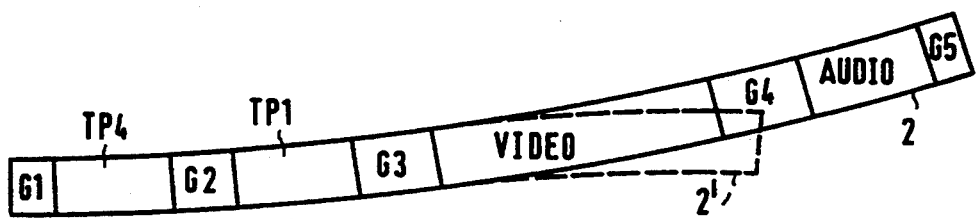
FIG. 3a illustrates the process of editing a track portion containing video information in a prior-art arrangement and FIG. 3b illustrates the edit mode of an arrangement in accordance with the invention.

Now it is assumed that in a prior-art situation, the track portion containing the video information has been recorded in the track before the track portion containing the audio information. This is shown in FIG. 3a. It is further assumed that the track portion containing the video information is to be edited. As the track portions TP1 and TP4 and the edit gaps $G_1$, $G_2$ and $G_3$ include a pilot signal in the digital data, an arrangement comprising a tracking mechanism will follow the existing track 2 in FIG. 3a until the edit gap $G_3$ is reached. Subsequently, the arrangement changes over to recording, so that tracking is then not possible. Thus, the arrangement will record the track portion with the new video information in accordance with the curve as represented by the track 3 in FIG. 2. The newly recorded track portion with the video information is represented by the broken line 2' in FIG. 3a. As this track portion is comparatively long, the lateral deviation relative to the original track will be large. It is evident that this will no longer yield a correct linkage with the remainder of the information in the track 2.

Figure 3B:
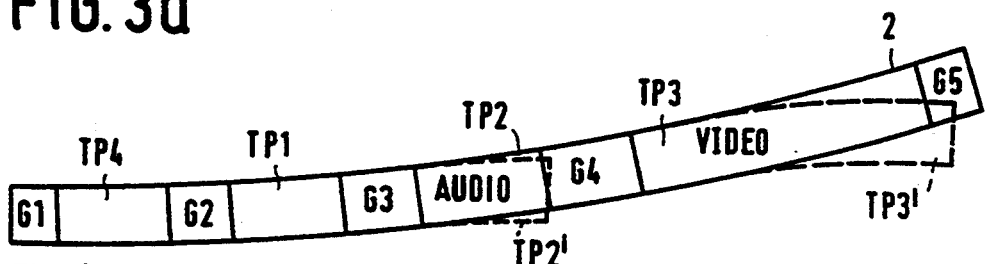

FIG. 3b shows how the track portion TP3 is edited if this portion is arranged at the rear in the track because the track portion with the video information is the longest track portion. In the edit mode, the track portion TP3' is formed. The lateral deviation of the track portion TP3' relative to the track portion TP3 is not a problem because the track portion TP3 is no longer followed by any information to be read.

It is now assumed that the track portion TP2 containing the audio information is to be overwritten in an edit mode. This results in the track portion TP2' shown in broken lines in FIG. 3b. It is evident that the lateral deviation relative to the original track portion TP2 is smaller, so that during subsequent reproduction, returning to the original track 2 can be realized by the tracking means within the edit gap $G_4$.

Figure 4:
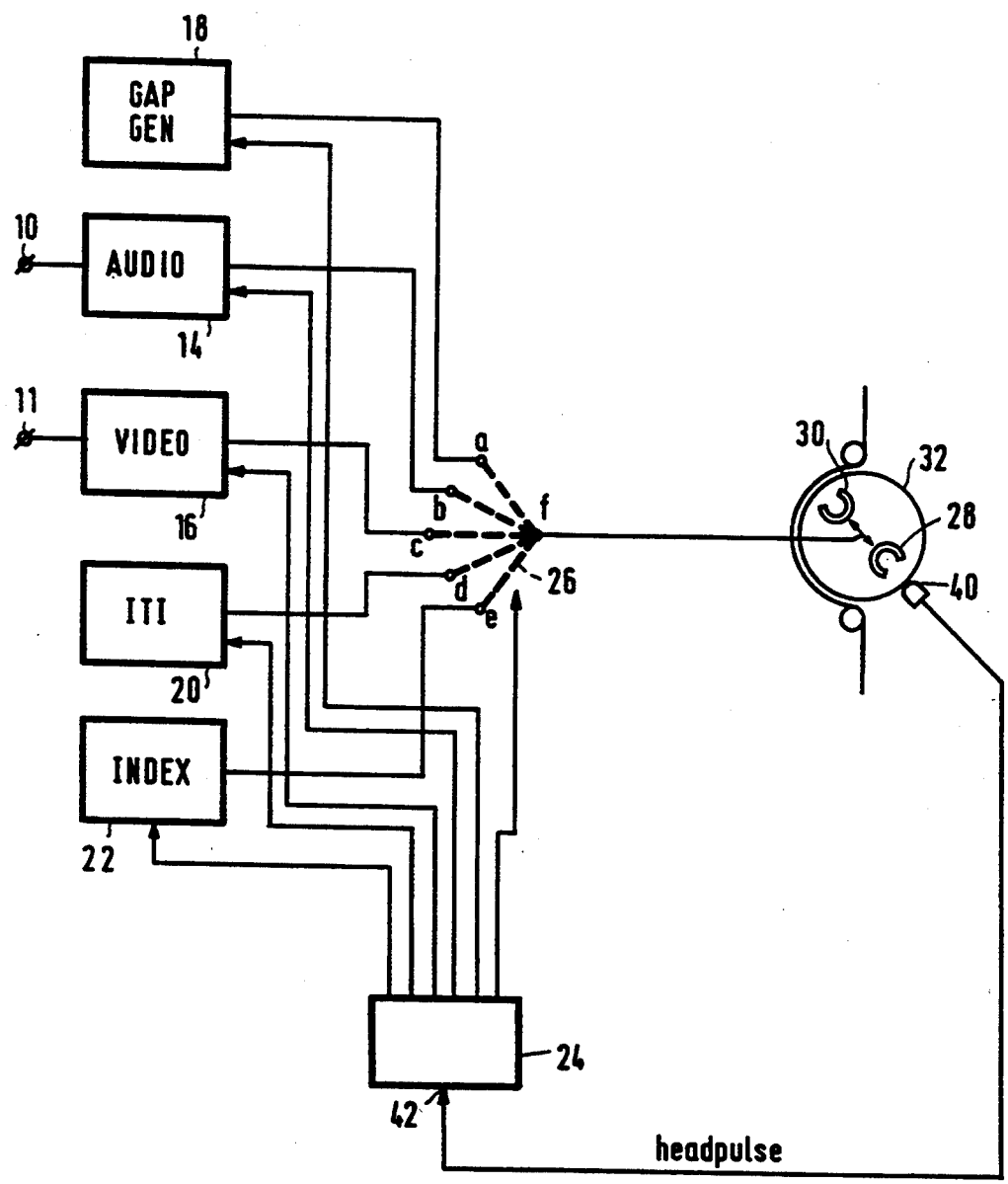
FIG. 4 shows an embodiment of the arrangement.

FIG. 4 shows diagrammatically an embodiment of the arrangement. The arrangement comprises a first input terminal 10 for receiving a digital audio signal and a second input terminal 11 for receiving a digital video signal. The digital audio information is processed in an audio signal processing unit 14 in a manner as described in European Patent Application 492,704 A1. The digital video information is processed in a video processing unit 16 in a manner as described in European Patent Application 492,704 A1. However, within the tracks, the sequence of the track portions in which the audio information and the video information is recorded differs from that in said Patent Application.

The arrangement further comprises an edit-gap signal generator 18, an ITI generator 20, an index generator 22, and a central control unit 24. The outputs of the generators 18, 20 and 22 and of the processing units 14 and 16 are each coupled to a terminal of a multi-position switch 26, which has an output terminal coupled to the write heads 28 and 30 arranged on a rotatable head drum 32.

The central control unit 24 is adapted to control the generators 18, 20 and 22, the processing units 14 and 16 and the switch 26. A control signal input 42 of the central control unit 24 is coupled to an output of a detector 40, which is arranged at a stationary location along the circumference of the drum 32, which detector supplies pulses which are a measure of the beginning of a track.

When the recording of a track, such as the track in FIG. 1, begins, the control unit 24 is responsive to a pulse applied via the input 42 to generate a control signal for the edit-gap generator 18. The control unit further generates a control signal for the switch 26 to set this switch to the upper position. The generator 18 generates the preamble or clock run-in signal to be recorded as the track portion $G_1$ in the track. Subsequently, the control unit 24 generates a control signal for the ITI generator 20, and a control signal for the switch 26, which is then set to position d-f. The generator 20 generates the signal to be recorded in order to obtain the track portion TP4 in the track. After this, the control unit 24 again generates a control signal for the edit-gap generator 18 and a control signal for the switch, causing it to be rest to the upper position. The generator 18 generates the signal to be recorded as the edit gap $G_2$ in the track. Subsequently, the control unit 24 generates a control signal for the INDEX generator 22, and a control signal for the switch 26, which is then set to position e-f. The generator 22 generates the signal to be recorded in order to obtain the track portion TP1 in the track. Subsequently, the control unit 24 again generates a control signal for the edit-gap generator 18 and a control signal for the switch, which is then reset to the upper position. The generator 18 generates the signal to be recorded as the edit gap $G_3$ in the track. Now the control unit 24 generates a control signal for the audio signal processing Unit 14, and a control signal for the switch 26, which is then set to position b-f. The processing unit 14 generates the signal to be recorded in order to obtain the track portion TP2 in the track. Subsequently, the control unit 24 again generates a control signal form the edit-gap generator 18 and a control signal for the switch, to reset this switch to the upper position. The generator 18 generates the signal to be recorded as the edit gap $G_4$ in the track. The control unit 24 now generates a control signal for the video signal processing unit 16, and a control signal for the switch 26, as a result of which this switch is set to position c-f. The processing unit 16 generates the signal to be recorded in order to obtain the track portion TP3 in the track. Finally, the control unit 24 again generates a control signal for the edit-gap generator 18 and a control signal for the switch to reset it to the upper position. The generator 18 generates the signal to be recorded as the postamble track portion $G_5$.

I claim:

1. An arrangement for recording a first digital signal, for example a subcode signal, a second digital signal, for example a digital audio signal, and a third digital signal, for example a video signal, in tracks on a magnetic record carrier, on which record carrier the tracks extend parallel to each other and at an angle relative to the longitudinal direction of said record carrier, the first digital signal to be recorded in a first track portion (TP1), the second digital signal to be recorded in a second track portion (TP2), and the third digital signal to be recorded in a third track portion (TP3) of the tracks, said arrangement comprising an input terminal for receiving the first digital signal, an input terminal for receiving the second digital signal, an input terminal for receiving the third digital signal, and recording means for recording the first, the second and the third digital signals in the first, the second and the third track portions, respectively, said first, second and third track portions being separated from one another by means of edit gaps ($G_3$, $G_4$), characterized in that the recording means are adapted to record the first, the second and the third digital signals in the first, second and third track portions in such a manner that, viewed in a direction from the beginning towards the end of the track, the first, the second and the third digital signals are recorded in sequence in the first, the second and the third track portions, respectively, and the length of the third track portion is greater than the length of the second track portion.

2. An arrangement as claimed in claim 1, characterized in that the length of the second track portion is greater than the length of the first track portion.

3. An arrangement as claimed in claim 2, characterized in that the length of the edit gap between the first and the second track portions is smaller than the length of the edit gap between the second and the third track portions.

4. A magnetic record carrier obtained by means of an arrangement as claimed in claim 2.

5. An arrangement as claimed in claim 1, characterized in that the length of the edit gap between the first and the second track portions is smaller than the length of the edit gap between the second and the third track portions.

6. A magnetic record carrier obtained by means of an arrangement as claimed in claim 5.

7. A magnetic record carder obtained by means of an arrangement as claimed in claim 1.

* * * * *